United States Patent Office 3,606,953
Patented Sept. 21, 1971

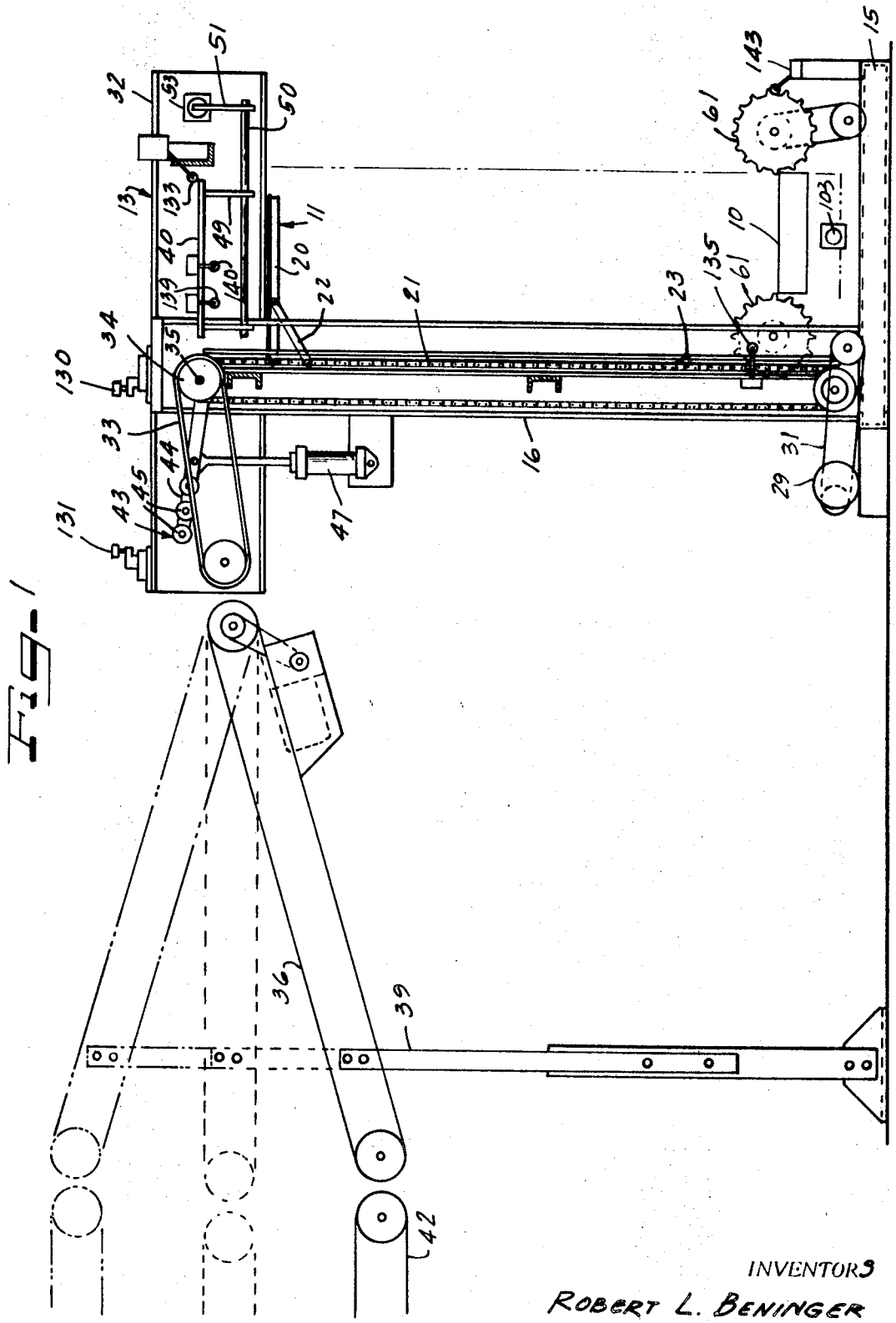

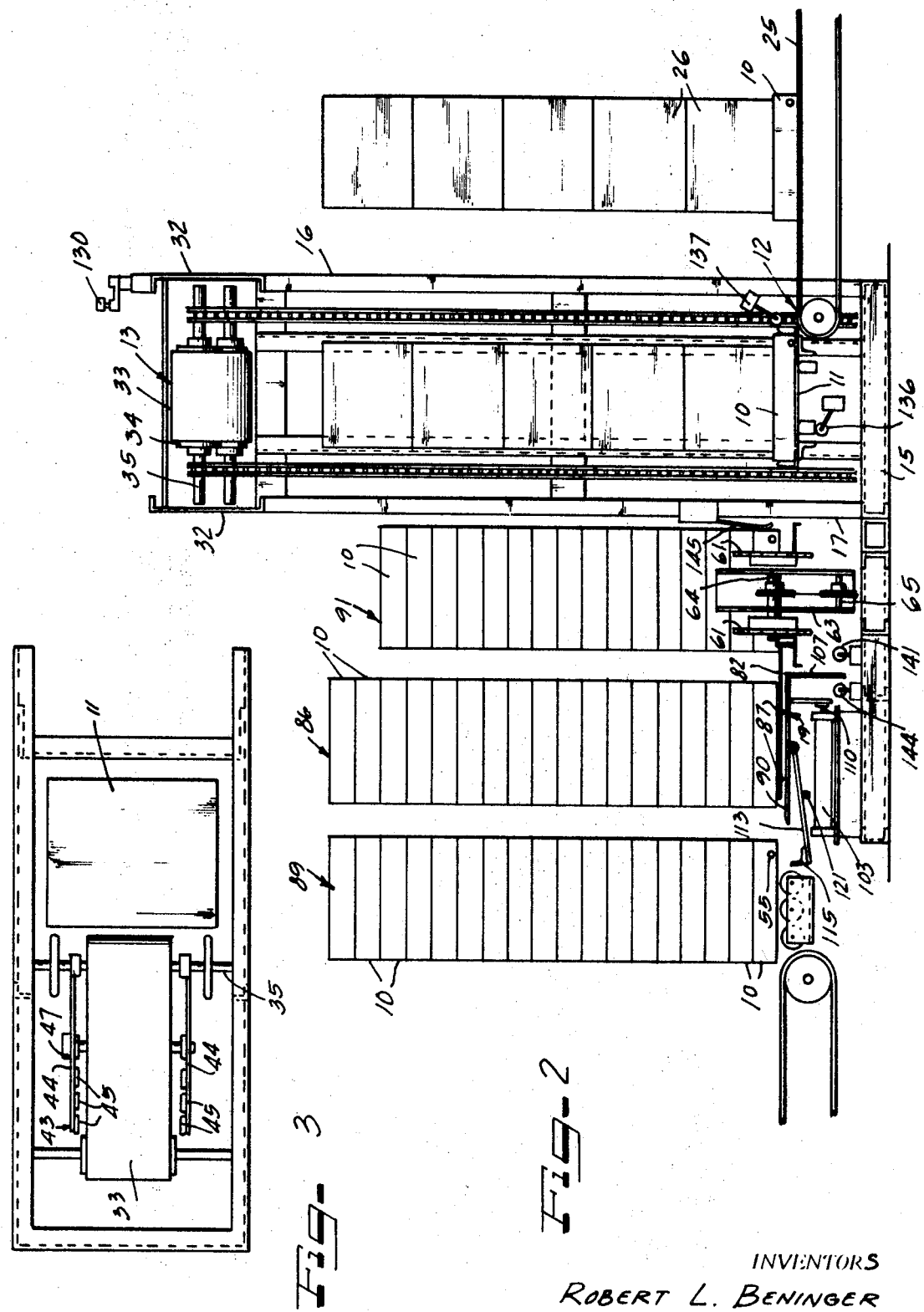

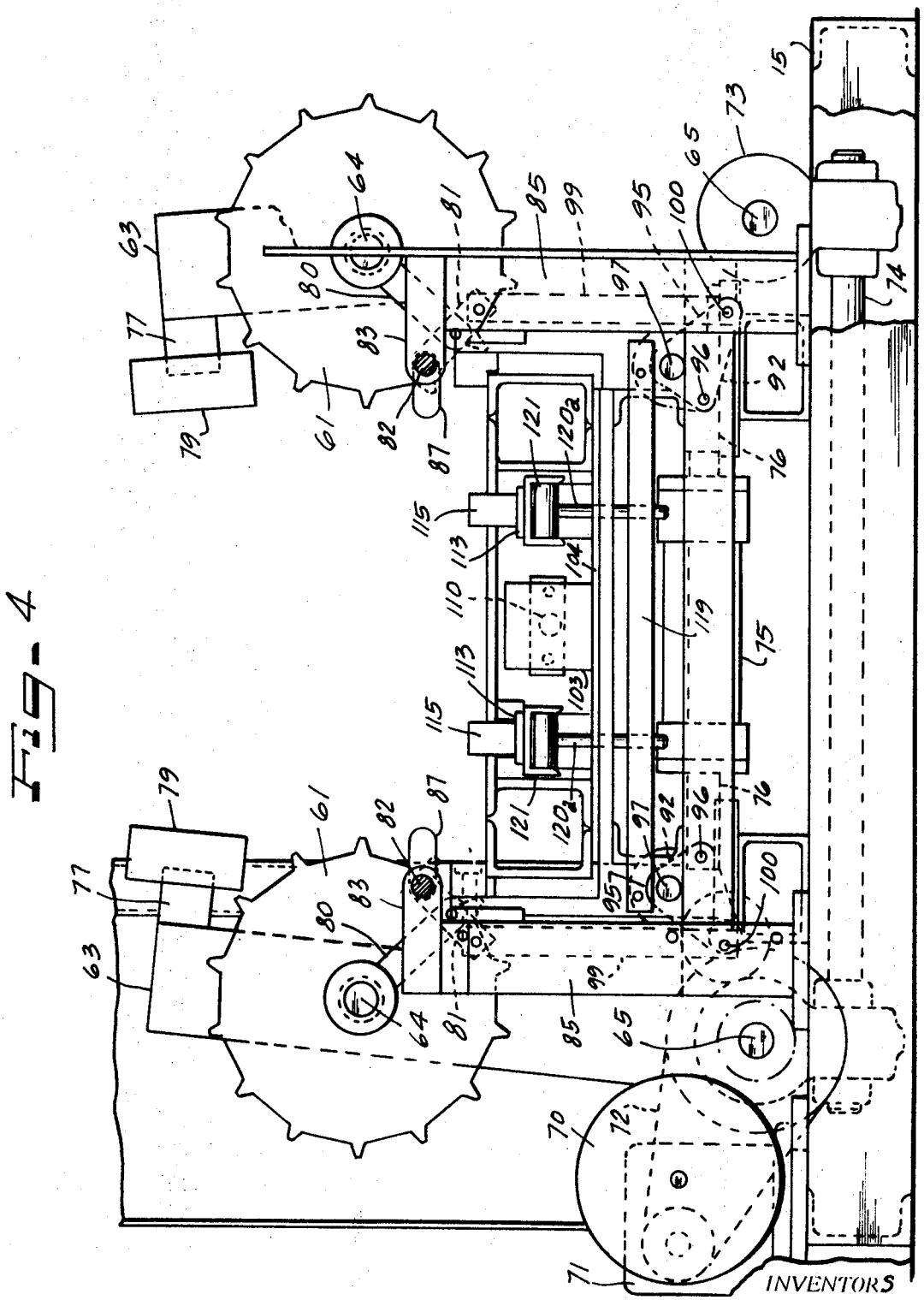

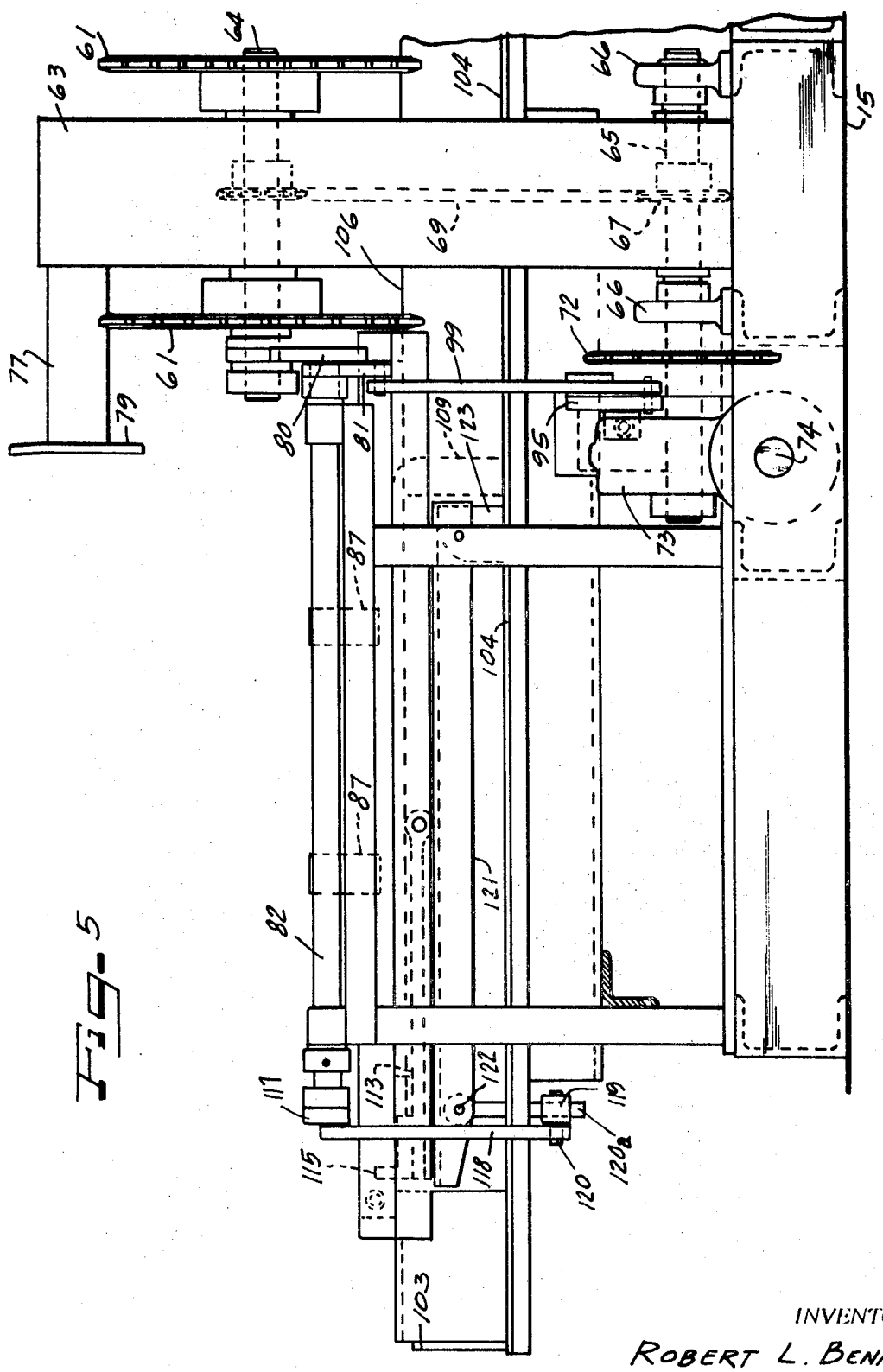

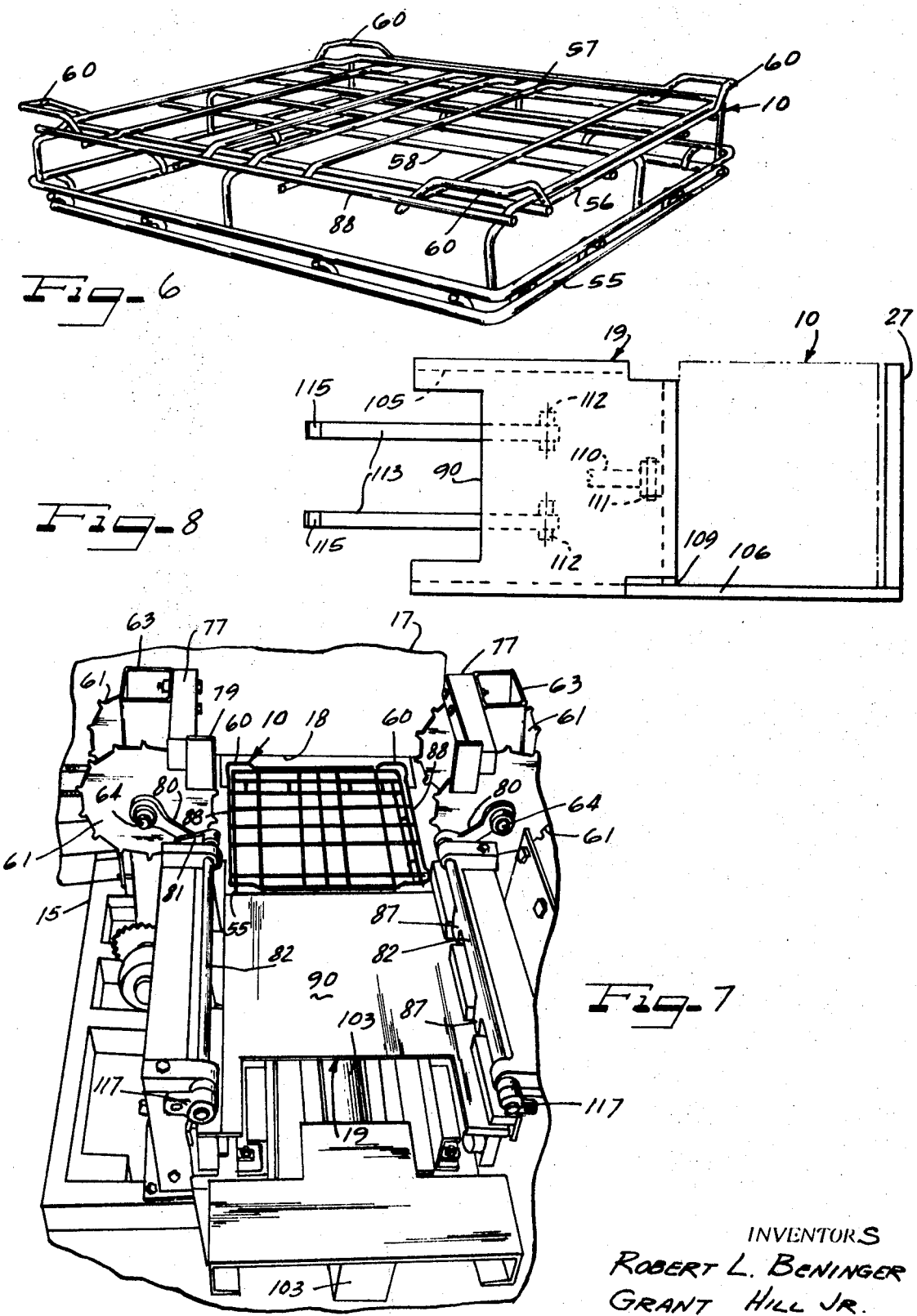

3,606,953
STACKER FOR BOX-LIKE ARTICLES AND PALLET SUPPLY MEANS THEREFOR
Robert L. Beninger, Sheboygan, and Grant Hill, Jr., Elkhart Lake, Wis., assignors to H. G. Weber and Company, Inc., Kiel, Wis.
Filed July 31, 1969, Ser. No. 846,353
Int. Cl. B65g 57/06
U.S. Cl. 214—6P
10 Claims

ABSTRACT OF THE DISCLOSURE

Apparatus for stacking box-like articles and supplying pallets for stacking. Pallets are supplied to a vertically movable platform by a carriage, guided for reciprocable movement beneath a stack of pallets. Sprocket holding devices hold the pallets above the carriage and release the pallets one by one to the carriage. A pallet reserve station is provided behind a pallet supply station. An in-line pallet infeed station is provided behind the pallet reserve station. The carriage moves the last pallet at the pallet supply station onto the platform as it ejects a pallet having a column of articles stacked thereon from the platform, and advances a stack of pallets to the pallet supply station, and a stack of pallets at the infeed station to the reserve station. Gripper arms at the reserve station hold the pallets above the carriage and accommodate reciprocable movement of the carriage and release the stack of pallets at the reserve station to the carriage for transfer to the pallet loading station. The carriage has puller arms engageable under a pallet at the infeed station, to pull a stack of pallets to the pallet reserve station as the pallets at the pallet reserve station are advanced to the pallet supply station.

SUMMARY AND OBJECTS OF INVENTION

Stacker for box-like articles, such as cases, in which a supply of pallets is maintained and pallets are individually supplied to a delivery station for the stacker and elevated to a loading station where cases are stacked on the pallet, one on top of the other, to provide a column of cases of the required height, in which a continuous supply of pallets is maintained and drawn to a pallet loading station, as the last pallet in the loading station has been deposited onto the platform at the delivery station, and in which the supply means for the pallets includes a reciprocating carriage, ejecting a pallet having a stack of cases thereon from the platform at the delivery station, supplying a pallet to the platform and adavancing a stack of pallets to the pallet loading station for supply to the platform for each stacking operation.

A principal object of the present invention is to provide a simplified form of stacker for box-like articles having an improved supply means for pallets continuously supplying a pallet for stacking with no interruption in the stacking operation.

Another object of the invention is to provide a novel and improved form of stacker arranged with a view toward attaining a continuous supply of pallets, to accommodate the stacking of columns of cases on the successively supplied pallets.

A further object of the invention is to improve upon the apparatus for stacking box-like articles in the form of a column, heretofore in use, operating on principles of stacking an article on a pallet at an elevated loading station, lowering the pallet in stages and successively stacking box-like articles on top of the article at the loading station, and supplying a pallet to the stacking platform for a next succeeding stacking operation, as the pallet and column of box-like articles on the platform are ejected therefrom.

Other objects, features and advantages of the invention will be readily apparent from the following description of a preferred embodiment thereof, taken in conjunction the the accompanying drawings, although variations and modifications may be effected without departing from the spirit and scope of the novel concepts of the disclosure.

DESCRIPTION OF THE DRAWINGS

FIG. 1 is a diagrammatic view in side elevation, diagrammatically illustrating a form of stacker constructed in accordance with the principles of the present invention.

FIG. 2 is a diagrammatic front end view of the stacker, with certain parts broken away and illustrating the pallet loading and reserve stations and the means for advancing pallets to the stacking platform and delivering a column of cases stacked on a pallet from the platform.

FIG. 3 is a diagrammatic plan view of a stacking apparatus diagrammatically showing portions of the pallet loading station and delivery stations, with certain parts removed.

FIG. 4 is an enlarged fragmentary end view of the pallet reserve and supply stations looking towards the stacker, with certain parts broken away and certain other parts removed.

FIG. 5 is an enlarged fragmentary view in side elevation of the pallet supply and pallet reserve stations, shown in FIG. 3 and 4, with certain parts broken away.

FIG. 6 is a perspective view of a form of pallet that may be utilized for a column of cases.

FIG. 7 is a generally perspective view, showing the pallet loading and reserve stations; and FIG. 8 is an enlarged fragmentary plan view of the carriage, illustrating the platform under the pallet reserve station, a pusher at the forward end of the pallet reserve station and a second pusher in advance of the pallet at the loading station.

DESCRIPTION OF PREFERRED EMBODIMENT OF INVENTION

In FIG. 1 of the drawings, we have diagrammatically shown a stacker operating on principles similar to the stacker shown in an application filed by Robert L. Beninger, Grant Hill, Jr. and Lawrence C. Oertle, Jr., Ser. No. 836,870. The stacker of our present invention differs from that of the previous invention in that the stacker is arranged to supply pallets 10 to a platform 11 at a lower delivery station 12, and to elevate the platform with a pallet thereon to an upper loading station 13, and accommodate the successive loading of box-like articles first on a pallet 10 and then one on top of the other to provide a column of box-like articles of the required height.

The stacker generally includes a base 15, a generally upright frame 16 extending upwardly of said base, and including a side vertical wall 17 having a rectangular opening 18 therein, through which a pallet 10 is supplied to the platform 11 by a reciprocably movable carriage 19, as will hereinafter more clearly appear as this specification proceeds.

The platform 11 may be in the form of a flat plate carried by parallel spaced angle irons 20 pivoted at their rear ends to aligned links of a pair of laterally spaced endless chains 21, guided along the upright frame 16 for reciprocable movement therealong, upwardly along said frame at a relatively fast return speed and downwardly along said frame, in steps at a slower stacking speed. Braces 22 are pivoted to the angle irons 20 intermediate the ends thereof and extend angularly downwardly therefrom to the chains 21 and are pivotally connected thereto. Suitable guide rollers (not shown) may be mounted on the endless chains 21 and extend within vertical guideways 23 for guiding the endless chains 21 and platform 11 along the upright frame 16, and to assure that the platform will always be in a horizontal position during travel thereof from the elevated loading station 13 to the lower delivery station 12.

The delivery station 12 is shown in FIG. 2 as being in the form of a belt conveyor 25 of a conventional form extending laterally of the platform 11 and base 15 when the platform 11 is in a lower delivery and pallet receiving position. As diagrammatically shown in FIG. 2, the conveyor 25 is carrying a pallet 10 having a column of cases 26 stacked thereon, which has been ejected from the platform 11 by an advance pusher bar 27 carried by the carriage 19. The conveyor 25 may be driven by a suitable motor (not shown) in a manner which need not herein be shown or described since it forms no part of the present invention.

The endless chains 21 guided in the vertically extending guides 23 are suitably driven from a main drive motor 29 suitably mounted on the base 15. The motor 29 may have a speed reducer housing as a part thereof driving the endless chains 21 through a chain and sprocket drive 31. The motor 29 may be a reversible two-speed motor, to effect elevation of the platform 11 from the lower delivery station 12 to the upper loading station 13, at a relatively high rate of speed and to move said platform downwardly at a lower stacking speed in stages from the loading station to the delivery station, as cases are stacked thereon.

The upper loading station 13 extends across the top of the upright frame 16 beyond opposite sides thereof and may be in the form of a pair of parallel spaced channels 32 suitably connected together and forming the frame 16 into a T-shaped frame.

An infeed conveyor 33, which may be of any suitable construction, is shown as mounted between the channels 32 inside of the endless chains 21. The infeed conveyor 33 turns about a drive roller 34 keyed or otherwise secured to an idler shaft 35 for the idlers for the endless platform chains 21. The infeed conveyor 33 may be driven from a separate motor (not shown) in a direction to advance box-like articles, such as cases 26 to parallel spaced slides 40 disposed above the platform 11 when in its elevated position, for successively loading a case onto said platform, and loading other cases on top of the first case and on top of each other, to form a column of cases. A conveyor 36 may be suitably connected to the channels 32 at its discharge end, and may be mounted at its receiving end between stands 39, to accommodate adjustment of the transfer conveyor to conform to the level of a supply conveyor 42, to accommodate the apparatus to conform to various levels of conveyors supplying cases for stacking, as indicated by broken lines in FIG. 1.

The loading station 13 also includes a gate 43 blocking the supply of cases along the infeed conveyor 33 when the platform 15 is not in position to receive a case, or when cases stacked on said platform would intercept the case on said infeed conveyor. The gate 43 is shown in FIGS. 1 and 3 as including a pair of parallel arms 44 pivoted for movement about the axis of the shaft 35, and extending along opposite sides of the infeed conveyor 33. The arms 44 have a series of rollers 45 extending inwardly therefrom, toward the conveyor 33, and positioned to engage and block the passage of cases along said infeed conveyor. The stop gate 43 including the arms 44 are raised and lowered about the axis of the shaft 35 by a fluid pressure cylinder and piston 47, as in the aforementioned application Ser. No. 836,870.

The slide rails 40 of the loading station 13 are in case receiving relation with respect to the infeed conveyor 33 and are disposed just above the platform 11 when in its loading position to support a case until said platform comes up to its loading position and then release a case for discharge onto a pallet 10 on the platform 11, or on the top of cases stacked on said pallet and platform. The slide rails 40 are shown in FIG. 1 as supported on the tops of parallel spaced arms 49 mounted on a rock shaft 50. A rock shaft 50 is mounted on the inside of each channel 32 for rocking movement with respect thereto and has a lever arm 51 extending upwardly of its outer end. A double-acting cylinder and piston having piston rods (not shown) extending from its opposite ends is connected to the lever arms 51 in a suitable manner to move the slide rails 40 into a case receiving and supporting position and to move said slide rails outwardly with respect to each other to deposit a case on a pallet 10 on the platform 11 when at the loading station 13, as in the aforementioned application Ser. No. 836,870, so not herein shown or described further.

Referring now in particular to the pallets 10 and means for supplying pallets to the platform 11 when completing a delivery cycle and in position to initiate a next succeeding loading cycle, each pallet 10 is shown in FIGS. 6 and 7 as being generally in the form of a rectangular inverted wire basket, having an open rectangular bottom frame 55 resting on the platform 11 and a top rectangular marginal frame 56 having cross-rods 57 and 58 respectively extending transversely and longitudinally thereof. The marginal frame 56 has formed wire corner retainers 60 at each corner thereof and engageable with the corners of a case 26 to retain a case thereon and to support a series of cases stacked one on top of the other.

The pallets 10 are held in elevated relation with respect to the carriage 19 by pairs of sprockets 61 extending along opposite sides thereof and having widely spaced teeth engaging the wires of the frame 55. The sprockets 61 are driven to release a pallet to be carried by the carriage 19 through the opening 18 onto the platform 11.

As shown in FIGS. 2 and 5, each pair of sprockets 61 is mounted on opposite sides of an upright housing 63, on a transverse drive shaft 64, holding the sprockets from rotation and driving said sprockets in a direction to successively release a pallet from the bottom of the stack of pallets, to be supplied through the opening 18 in the wall 17 to the platform 11.

Each upright housing 63 is pivoted to the base 15 on a shaft 65, carried by the base 15 in pillow blocks 66. The shaft 65 has a sprocket 67 thereon, forming a drive sprocket for the shaft 64 and the sprockets 61 through a chain and sprocket drive 69 (FIGS. 2 and 5). The shafts 65 on opposite sides of the loading station are driven from a motor 70 and speed reducer gearing in a speed reducer housing 71 through a chain and sprocket drive 72, driving a shaft 65. The shafts 65 are connected together to be rotatably driven at the same rates of speed by right angled gearing in housings 73 and a shaft 74 extending transversely of the base 15 and journalled in said housings.

Power means, operated by a fluid pressure motor 75, which may be a double-acting motor having piston rods 76 extensible from opposite ends thereof, is provided to move the housings 63 and sprockets 61 outwardly of the stack of pallets about the axes of the shafts 65 to accommodate a reserve stack of pallets to be moved up to the supply stack location.

The upright housings 63 are of a box-like structure, and provide rigid supports for the sprockets 61, of sufficient rigidity to enable said sprockets to be engaged with a bottom pallet of a stack of pallets and hold the entire stack of pallets above the carriage 19 and to then release the pallets one by one. Said housing also have arms 77 secured to the inner faces thereof and extending rearwardly therefrom and have holding pads 79 secured to the ends thereof and extending vertically and toward each other. The holding pads 79 engage the rear edges of the pallets of the stack of pallets in a pallet supply station 91, to retain the stack in position and hold the stack from moving rearwardly upon rearward movement of the carriages 19 away from the platform 11. The holding pads 79 move outwardly of the stack of pallets upon outward movement of the housing 63.

The means for holding the housing 63 and sprockets 61 in position to support a stack of pallets above the carriage 19 and for moving said housings and sprockets outwardly of the carriage is herein shown as comprising crank arms 80 journalled on the shafts 64 adjacent the rear ends thereof and extending angularly inwardly and downwardly of said shaft toward the longitudinal center of the carriage 19. Said crank arms 80 are pivotally connected to crank arms 81, intermediate the ends of said crank arms. The crank arms 81 are keyed or otherwise secured to the forward end portions of longitudinal shafts 82, and extend angularly downwardly and outwardly therefrom (FIG. 4). The shafts 82 are rotatably mounted in longitudinally spaced backets 83 secured to the upper ends of uprights posts 85 at opposite ends and sides of a pallet reserve station 86. The longitudinal shafts 82 each have a pair of parallel spaced lift arms 87 keyed or otherwise secured thereto and extending inwardly therefrom. The lift arms 87 have rounded engaging and supporting end portions and are pivotally moved by pivotal movement of the shafts 82 to engage under wire frame members 88 of a pallet 10 extending along each side of said pallet and forming a portion of the upper marginal frame 56 of the pallet, to lift a stack of pallets advanced thereto from a pallet infeed station 89, and hold the pallets above a reciprocating support plate or apron 90 of the carriage 19, when said carriage is supplying a pallet from the bottom of a stack of pallets at the pallet supply station 91 to the platform 11, as the pallets are successively released to said pallet supply station. The arms 87 are pivoted downwardly to release the stack of pallets in the pallet reserve station, to drop onto a support plate 93, to be carried to the pallet supply station 91 upon movement of the carriage 19 towards the platform 11.

The lift arms 87 move downwardly upon outward movement of the housing 63 and inwardly upon inward movement of said housings, by operation of the double-ended fluid pressure operated motor 75, as will now be described.

The piston rods 76 of the fluid pressure operated motor 75 move inwardly and outwardly together (FIG. 4). Each piston rod 76 is connected at its outer ends to a bell crank 95 on a pivot pin 96. The bell crank 95 is pivoted intermediate its ends for movement about a fixed pivot on a pivot pin 97. A third arm of the bell crank 95 has the lower end of a link 99 pivoted thereto on a pivot pin 100. The link 99 extends upwardly in front of the front post 85 and is pivotally connected at its upper end to the lower outer end of the crank arm 81. Thus, outward movement of the piston rod 76 will pivot the bell cranks 95 and move the links 99 in an upward direction and thus pivot the lift arms 87 downwardly to release positions, to release a stack of pallets in the reserve station to drop to the apron 90 and be carried by said apron to the supply station 91, as the last pallet in the supply station is advanced to the platform 11. Upward movement of the crank arms 81 to release the lift arms 87 from the stack of pallets will also move the housings 63, sprockets 61 and holding pads 79 outwardly about the axes of the shafts 65, to accommodate a stack of pallets in the reserve station 86 to be supplied to the supply station 91 by movement of the apron 90 to said supply station.

As a stack of pallets has been transferred from the reserve to the supply station, the upright housings 63 will be moved inwardly to bring the holding pads behind the stack of pallets in the supply station and to bring the sprocket teeth of the sprockets 61 into engagement with the bottom pallet of the stack of pallets on the apron 90, and hold the stack of pallets above the carriage 19 as the apron 90 moves back to the pallet reserve station. The lift arms 87 will engage beneath the rods 82 of the bottom pallet 10 and elevate the stack of pallets in the reserve station above the apron 90.

The carriage 19 is reciprocably moved back and forth by a long stroke fluid pressure operated cylinder and piston 103 having a piston rod 110 extensible therefrom. The cylinder 103 is mounted on a base plate 104, for the base 15 in a suitable manner.

The carriage 19 includes the apron 90, mounted on parallel spaced slide rails, 105 and 106, which extend along opposite sides thereof. The slide rail 106 is longer than the slide rail 105, and extends in advance of the apron 90 beyond the leading or forward end thereof a distance slightly greater than the length of a pallet. A pusher bar 27 is mounted on and extends laterally of the slide rail 106 in alignment with and parallel to the front edge of the apron 90. A second pusher bar 109 is disposed beneath and extends along the front edge of the apron 90. The pusher bars 27 and 109 are thus normally positioned to extend across the front and rear sides of a pallet 10 in the pallet supply station 91, when the carriage 19 is in its retracted position. Thus, when fluid under pressure is admitted to the head end of the cylinder 103, the piston rod 110 will advance the carriage 19 to engage the pusher 27 with a pallet 10 on the platform 11 and having a column of cases stacked thereon, and push the pallet and column of cases from said platform onto the conveyor 25. As a pallet and stack of cases is ejected from the platform 11, the pusher bar 109 will advance a pallet onto said platform 11. The space between the pusher bars 27 and 109 is sufficient to accommodate the platform 11 to move upwardly to the loading station 13 with a pallet thereon. The carriage may be returned to its retracted position during this movement.

The pusher 109 has a mounting bracket 111 for the piston rod 110 extending rearwardly of its rear face. The apron 90 has two pairs of laterally spaced lugs 112 depending therefrom equally spaced from opposite sides of the center line of said apron and disposed rearwardly of the mounting bracket 111. The lugs 112 form pivotal mounting brackets for a pair of puller arms 113, each of which puller arms extends between a pair of lugs 112 and is transversely pivoted thereto. The puller arms 113 have upright hook-like rear end portions, extending upwardly therefrom, adapted to hook under a lower wire of the marginal frame 55 of the pallet 10 and draw said pallet and the pallets stacked thereon with the apron 90 as the pusher 27 ejects a pallet, having a column of cases stacked thereon, from the platform 11 to be carried away by the conveyor 25. At the same time, the pusher bar 109 pushes a last pallet of the stack of pallets in the supply station to the platform 11, while the apron 90 transfers a stack of pallets from the reserve station to the pallet supply station 91. The carriage 19 thus in effect, performs four transfer operations during one forward stroke thereof, and assures that the pallet supply and pallet reserve stations will always have stacks of pallets thereon.

The puller arms 113 are simultaneously raised to engage the lower pallet of the incoming stack of pallets coming into the incoming station 89 as the housings 63 are pivoted outwardly about the axes of their support shafts 65, and the lift arms 87 are released to drop a stack of pallets in the reserve station onto the apron 90. This is attained by operation of a crank 117 secured to the outer or rear end of each shaft 82. Each crank 117 has a link 118 pivoted thereto for movement about an axis parallel to the axis of the shaft 82. The links 118 are pivoted at their lower ends to a transverse beam 119 on pivot pins 120. The beam 119 has a pair of parallel spaced I-bolts $120_a$ threaded therein and extending upwardly therefrom. Said I-bolts are pivoted at their upper ends between the flanges of longitudinally extending channels 121 on pivot pins 122. The top surfaces of the webs of the channels 121 form ramps or slidable supports for the puller arms 113, which are slidably movable therealong. The channels 121 extend in parallel relation with respect to each other toward the forward end portion of the pallet reserve station 86 and are transversely pivoted to upright brackets 123 extending upwardly of the base plate 104 for the reserve and supply stations 86 and 91 respectively.

As the pivot shafts 82 are pivoted in a direction to release the lift arms 87 from a stack of pallets in the reserve station, the crank arms 117 will move in a direction to raise the links 118, beam 119 and pivot the channels or ramps 121 about the axes of the pivot pins 125. This will effect pivotal movement of the lift arms upwardly in position to engage under the bottom pallet of a stack of incoming pallets, and pull the stack of incoming pallets to the pallet reserve station, as a stack of pallets is transferred from the pallet reserve station to the pallet supply station, a pallet having a stack of box-like articles thereon is ejected from the platform 11, while the last pallet in the pallet supply station is transferred to the platform 11. The housings 63, sprockets 61 and pads 79 are moved out of the paths of an incoming stack of pallets from the reserve station as the lift arms 87 are released and as the puller arms 113 are pivoted upwardly to engage behind and pull a stack of pallets with the carriage 19.

The control of reciprocable vertical movement of the platform 11, the supply of pallets to said platform and the ejection of a pallet having a column of cases stacked thereon from said platform, is by a series of limit switches and relays (not shown) in an electrical control circuit (not shown), some of which relays may be time delay relays. Limit switches 130, 131 and 133 are located at the loading station 13, and control the loading of a case onto the platform 11, the opening and closing of the stop gate 43, the release of the slides 40 to deposit a case on said platform, and the initiation of lowering movement of said platform with a case loaded thereon.

A limit switch 144 is disposed beneath the carriage 19 and is closed by said carriage when in its retracted position. This limit switch must be held closed by the carriage 19 and the limit switch 131 must be held closed by a case 26 before the limit switch 133 can function. A limit switch 135 is spaced downwardly along the frame 16, close to but above the delivery station 12, and is in position to be operated by the platform 11 upon lowering movement thereof. This limit switch effects closing of the gate 43 and overrides the limit switch 133 to continue lowering movement of the platform 11, until the pallet 10 thereon is in alignment with the conveying surface of the belt conveyor 25 at the delivery station 12.

A limit switch 136 is disposed at the delivery station 12 beneath the platform 11 when in its lowermost position, and is closed as engaged by the bottom of said platform. This stops the main drive and the infeed conveyor 33. At the same time, fluid under pressure is admitted to the head end of the cylinder 103 to effect operation of the carriage 19, to push a bottom pallet and a column of cases stacked thereon from the platform 11 onto the conveyor 25 and a pallet at the pallet supply station to said platform, and to reverse the main drive motor. As the cylinder 103 reaches the end of its stroke, a limit switch 137 will be closed by the pallet 10, this will start the platform 11 up with a pallet 10 thereon at twice its lowering speed. A limit switch 139 is provided at the loading station 13 and is closed by the platform 11 as it reaches a loading level. This will stop the main drive, reverse the main drive and effect the supply of fluid under pressure to the piston rod end of the cylinder 103 and return the carriage 19. At the same time, the platform 11 will also close a limit switch 140, which will open the infeed gate 43 and start the stacking sequence, to effect stacking of a column of cases on a pallet 10 supported on the platform 11.

As the carriage 19 travels on its return path, it will momentarily close a limit switch 141 and effect the starting of the drive to the feed sprockets 61. A limit switch 143 engaging the teeth of a sprocket 61 will then be operated to stop the drive to the sprockets 61 when one tooth of each of said sprockets is in position to let a single pallet drop into the space between the pusher bars 27 and 109 onto the base plate 104.

When the last pallet has been discharged from the pallet supply station, a limit switch 145 will be released and close. This will effect retraction or outward movement of the housings 63 and sprockets 61, the release of the lift arms 87, and the lifting of the puller arms 113 to insert the upright engaging end portions 115 thereof within the marginal frame of a lower pallet 10, of a stack of pallets, in the pallet infeed station. The cylinder 103 will then be supplied with fluid under pressure to eject a pallet with the stack of cases thereon from the platform 11, push an empty pallet onto the platform 11, advance a stack of pallets in the reserve stack to the pallet supply station and pull an incoming stack of pallets into the reserve stack station.

The next stack of pallets 10 when in position in the pallet loading station will open limit switch 145 and effect return of the piston rod 110 and carriage 19. This will also energize the cylinder 75 (FIG. 4) to effect movement of the housings 63 inwardly to engage the retainer sprockets 61 with the stack of pallets and upward movement of the lift arms 87, to lift the stack of pallets in the reserve stack above the apron 90 and lowering movement of the beam 119 and ramps 121 to retract the puller arms 113 beneath the level of the apron 90.

We claim as our invention:

1. An apparatus for successively supplying pallets to a vertically movable platform and ejecting a pallet having at least one article stacked thereon from the platform as a pallet is supplied thereto, comprising:
   a pallet supply station at one side of said platform,
   a pallet reserve station rearwardly of said pallet supply station,
   a carriage movable along said pallet supply and pallet reserve stations toward and from said platform,
   ejector means carried by said carriage and movable along said platform for ejecting a pallet having at least one article stacked thereon from said platform,
   other means spaced rearwardly of said ejector means, advancing a pallet to said platform as said ejector means ejects a pallet and article stacked thereon from said platform,
   means at said pallet supply station engageable with a pallet of a stack of pallets for holding the stack of pallets over said carriage and releasing the pallets one by one to be advanced by said carriage to said platform, and
   means at said pallet reserve station holding a stack of pallets above said carriage and releasing a stack of pallets to said carriage to be carried to said supply station by said carriage as said carriage advances the last pallet in said supply station to said platform.

2. An apparatus for supplying pallets to a vertically movable platform in accordance with claim 1,
   wherein a pallet infeed station is disposed rearwardly of said pallet reserve station, and
   wherein said carriage is provided with movable means engageable with the bottom pallet of a stack of pallets at said infeed station to pull the stack of pallets to said pallet reserve station as a stack of pallets in said pallet reserve station is advanced to said pallet supply station and the last pallet in said pallet supply station is advanced to said platform.

3. An apparatus for supplying pallets to a vertically movable platform in accordance with claim 1.
   wherein said carriage includes a flat apron disposed beneath the pallets in said pallet reserve station,
   wherein the ejector means comprises a pusher spaced in advance of said apron,
   wherein the means advancing a pallet to said platform comprises a pusher at the leading end of said apron,
   wherein said pushers are spaced apart a distance sufficient to receive a pallet in the space therebetween and define the ingoing and outgoing margins of said pallet supply station, and wherein said pushers provide an open area opening to one side of said pallet and accommodating vertical movement of said platform having a pallet thereon, as said advance pusher has ejected a pallet having at least one article stacked thereon from said platform.

4. The apparatus for supplying pallets to a vertically movable platform of claim 3, including,
a pallet infeed station on the outgoing side of said pallet reserve station,
at least one puller arm mounted on said carriage beneath said apron for pivotal movement about an axis extending transversely of said apron and extending rearwardly therefrom,
said puller arm having a rear engaging end portion,
means operable upon release of a stack of pallets onto said apron at said pallet reserve station, for elevating said puller arm into engagement with a bottom pallet of a stack of pallets at said pallet infeed station, and
power means advancing said carriage toward said platform to carry a stack of pallets on said apron to said pallet supply station and advance a stack of pallets at said pallet infeed station to said pallet reserve station as a pallet is supplied to said platform and a pallet on said platform having at least one article stacked thereon is ejected from said platform by said carriage.

5. An apparatus for supplying pallets to a vertically movable platform in accordance with claim 1,
wherein the means at the pallet supply station engageable with a pallet of the stack of pallets for holding the stack of pallets over said carriage comprises at least one sprocket at each side of said pallet supply station, each sprocket having at least one tooth engaging and holding a stack of pallets above said carriage,
upright supports providing bearing mountings for said sprockets,
means mounting said supports for movement about axes extending parallel to the direction of travel of said carriage and spaced outwardly of opposite sides thereof,
power means holding said sprockets from rotation and driving said sprockets at the same rate of speed to hold the stack of pallets above said carriage and release pallets to said carriage one by one,
other power means moving said upright arms toward the longitudinal center line of said carriage to engage a tooth of each of said sprockets with opposite sides of a pallet of a stack of pallets at said supply station and hold the teeth in engagement with the pallet, and accommodating rotation of said sprockets to release a pallet at said supply station, to be carried by said pusher to said platform.

6. An apparatus for supplying pallets to a vertically movable platform in accordance with claim 5,
wherein lift arms are provided at said pallet reserve station and are spaced above said carriage and apron on opposite sides thereof and are supported for pivotal movement about axes extending in the direction of travel of said carriage,
wherein power means are provided to pivotally move said lift arms to engage under and lift a stack of pallets at said pallet reserve station, above said apron, and hold the stack of pallets in lifted relation with respect to said apron,
wherein the means lifting said lift arms also move said lift arms to release a stack of pallets at said pallet reserve station to rest on said apron, and
wherein the means rotatably driving said sprockets to release a bottom pallet and moving said upright supports away from the stack of pallets at the pallet supply station, also has operative connection with said lift arms to effect lowering movement of said lift arms as said upright supports are moved outwardly to clear said pallet supply station, to accommodate the stack of pallets to be advanced from said pallet reserve station to said pallet supply station.

7. The apparatus for supplying pallets to a vertically movable platform in accordance with claim 6,
wherein the upright supports have abutment pads thereon extending behind the stack of pallets in said pallet supply station and holding the stack of pallets in said pallet reserve station from rearward movement upon rearward movement of said carriage.

8. In a stacker for box-like articles, such as cases, including an upright frame having a base, said frame having,
an elevated loading station,
an aligned lower delivery station,
a platform guided for vertical movement along said frame between said loading and delivery stations,
means at said loading station for stacking box-like articles on said platform,
power means moving said platform from said delivery to said loading station and for lowering said platform to said delivery station in steps governed by the heights of box-like articles stacked thereon,
the improvements comprising,
pallet supply means, including a pallet supply station,
a pallet reserve station spaced rearwardly of said supply station and in alignment therewith, and
a pallet infeed station spaced rearwardly of said reserve and supply stations and in alignment therewith,
a carriage disposed beneath said stations,
power means for reciprocably moving said carriage toward and from said delivery station,
said carriage including an apron disposed beneath a stack of pallets in said pallet reserve station,
a pusher disposed rearwardly of a pallet in said pallet supply station,
an advance pusher in advance of a pallet at said pallet supply station and behind a pallet at said delivery station,
said carriage also having means thereon extending to said pallet infeed station for engagement with the bottom pallet of a column of pallets stacked thereon,
whereby movement of said carriage toward said delivery station will effect the ejection of a pallet having a column of box-like articles stacked thereon from said platform and said delivery station, the supply of a pallet to said platform, the transfer of a stack of pallets at said pallet reserve station to said pallet supply station, and the transfer of a stack of pallets from said pallet infeed station to said pallet reserve station.

9. In a stacker for box-like articles, such as cases, including an upright frame having a base, said frame having,
an elevated loading station,
an aligned lower delivery station,
a platform guided for vertical movement along said frame between said loading and delivery stations,
means at said loading station for stacking box-like articles on said platform,
power means moving said platform from said delivery to said loading station and for lowering said platform to said delivery station in steps governed by the heights of box-like articles stacked thereon.
the improvements comprising, pallet supply means, including a pallet supply station,
a carriage operable to deliver pallets to said platform and reciprocable mounted on said base,
said carriage having a leading pusher for engaging a pallet on said platform having a stack of box-like articles thereon for discharging same from the delivery station and a trailing pusher for simultaneously pushing a pallet from said pallet supply station onto said platform, means for holding a stack of pallets at said pallet supply station above said station and for sequentially releasing a bottom pallet of the stack of pallets to said carriage comprising, housings extending upwardly from said base along opposite sides of said pallet loading station and mounted on said base for movement about axes extending in the direction of travel of said carriage, a pair of parallel spaced sprockets carried by each of said housings each sprocket having at least one tooth having interengagement with the bottom pallet of the stack of pallets, for holding the stack of pallets above said carriage, means pivotally moving said housings towards said stack of pallets to maintain the teeth of said sprockets into engagement with the bottom pallet of the stack of pallets and hold said sprockets in engagement with the bottom pallet of the stack of pallets, other means simultaneously driving said sprockets at the same rates of speed to release a bottom pallet from the stack of pallets, said means holding said sprockets into engagement with the bottom pallet of the stack of pallets also moving said sprockets outwardly of said pallet loading station to accommodate the supply of a new stack of pallets thereto.

10. The stacker of claim 8, wherein means are provided at said pallet reserve station for holding a stack of pallets at said station above said carriage, to accommodate said carriage to reciprocably move with respect thereto, to supply pallets from said pallet supply station to said platform and to deliver a pallet having a column of box-like articles stacked thereon from said delivery station.

References Cited

UNITED STATES PATENTS

| | | | |
|---|---|---|---|
| 2,946,465 | 7/1960 | Raynor | 214—6(P) |
| 2,947,405 | 8/1960 | Fenton | 214—6(P)X |
| 2,977,002 | 3/1961 | Asp | 214—6(P) |
| 3,142,389 | 7/1964 | Bolt | 214—6(P) |
| 3,245,557 | 4/1966 | Maramonte et al. | 214—6(P) |
| 3,273,751 | 9/1966 | De Wees | 214—8.5(K)X |
| 3,458,058 | 7/1969 | Faerber | 214—6(P) |
| 3,459,314 | 8/1969 | Faerber | 214—6(P) |
| 3,468,436 | 9/1969 | Nanney et al. | 214—6(P) |

FOREIGN PATENTS

| | | | |
|---|---|---|---|
| 1,419,765 | 10/1965 | France | 214—6(P) |

GERALD M. FORLENZA, Primary Examiner

R. J. SPAR, Assistant Examiner

U.S. Cl. X.R.

214—8.5H